(12) United States Patent
Dunn et al.

(10) Patent No.: US 9,653,219 B2
(45) Date of Patent: *May 16, 2017

(54) MESOPOROUS NANOCRYSTALLINE FILM ARCHITECTURE FOR CAPACITIVE STORAGE DEVICES

(71) Applicant: THE REGENTS OF THE UNIVERSITY OF CALIFORNIA, Oakland, CA (US)

(72) Inventors: Bruce S. Dunn, Los Angeles, CA (US); Sarah H. Tolbert, Encino, CA (US); John Wang, Glendora, CA (US); Torsten Brezesinski, Pohlhein (DE); George Gruner, Los Angles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 302 days.

This patent is subject to a terminal disclaimer.

(21) Appl. No.: 14/173,490

(22) Filed: Feb. 5, 2014

(65) Prior Publication Data
US 2014/0301020 A1    Oct. 9, 2014

Related U.S. Application Data

(63) Continuation of application No. 13/177,401, filed on Jul. 6, 2011, now Pat. No. 8,675,346, which is a
(Continued)

(51) Int. Cl.
 *H01G 9/028* (2006.01)
 *H01G 11/36* (2013.01)
(Continued)

(52) U.S. Cl.
 CPC ............. *H01G 11/36* (2013.01); *H01G 11/24* (2013.01); *H01G 11/26* (2013.01); *H01G 11/46* (2013.01);
(Continued)

(58) Field of Classification Search
 CPC    H01G 9/00; H01G 9/04; H01G 9/028; H01G 11/46
(Continued)

(56) References Cited

U.S. PATENT DOCUMENTS 4,706,162 A * 11/1987 Hernandez ............... H01G 2/12
 361/306.2
7,144,658 B2    12/2006 Long et al.
(Continued)

OTHER PUBLICATIONS

Guo, Y. et al.—"Superior Electrode Performance of Nanostructured Mesoporous TiO2 (Anatase) through Efficient Hierarchical Mixed Conducting Networks"—Advanced Materials, vol. 19, 2007, pp. 2087-2091.
(Continued)

*Primary Examiner* — Nguyen Ha
(74) *Attorney, Agent, or Firm* — John P. O'Banion

(57) ABSTRACT

A mesoporous, nanocrystalline, metal oxide construct particularly suited for capacitive energy storage that has an architecture with short diffusion path lengths and large surface areas and a method for production are provided. Energy density is substantially increased without compromising the capacitive charge storage kinetics and electrode demonstrates long term cycling stability. Charge storage devices with electrodes using the construct can use three different charge storage mechanisms immersed in an electrolyte: (1) cations can be stored in a thin double layer at the electrode/electrolyte interface (non-faradaic mechanism); (2) cations can interact with the bulk of an electroactive material which then undergoes a redox reaction or phase change, as in conventional batteries (faradaic mechanism); or (3) cations can electrochemically adsorb onto the surface of a material through charge transfer processes (faradaic mechanism).

4 Claims, 9 Drawing Sheets

Related U.S. Application Data continuation of application No. PCT/US2010/020572, filed on Jan. 9, 2010.

(60) Provisional application No. 61/143,653, filed on Jan. 9, 2009.

(51) Int. Cl.
  *H01G 11/46* (2013.01)
  *H01G 11/24* (2013.01)
  *H01G 11/26* (2013.01)
  *B82Y 99/00* (2011.01)

(52) U.S. Cl.
  CPC ............... *B82Y 99/00* (2013.01); *Y02E 60/13* (2013.01); *Y10S 977/948* (2013.01)

(58) Field of Classification Search
  USPC ................. 361/502, 503–504, 512, 516–519
  See application file for complete search history.

(56) References Cited

U.S. PATENT DOCUMENTS

| | | | | |
|---|---|---|---|---|
| 8,675,346 B2* | 3/2014 | Dunn | ...................... | H01G 11/46 361/502 |
| 2004/0131934 A1* | 7/2004 | Sugnaux | ................ | B82Y 20/00 429/209 |
| 2004/0252099 A1 | 12/2004 | Walder et al. | | |
| 2011/0027572 A1 | 2/2011 | Wiesner | | |

OTHER PUBLICATIONS

Fattakhova-Rohlfing et al. —"Highly Organized Mesoporous TiO2 Films with Controlled Crystallinity: A Li-Insertion Study"—Advanced Functional Materials, vol. 17, 2007, pp. 123-132.

Kubiak, P. et al.—"Electrochemical performance of mesoporous TiO2 anatase"—Jour. of Power Sources, vol. 175, 2008, pp. 510-516.

Hagfeldt, A. et al.—"Photocapacitance of Nanocrystalline Oxide Semiconductor Films: Band-Edge Movement in Mesoporous TiO2 Electrodes during UV Illumination"—Jour. of Physical Chemistry, vol. 100, No. 20, May 16, 1996, pp. 8045-8048.

Korean Intellectual Property Office, international search report and written opinion issued on Dec. 21, 2010, related PCT Application No. PCT/US2010/020572, including application and claims searched, pp. 1-67.

United States Patent and Trademark Office, Non Final Office Action issued on May 17, 2013 for parent U.S. Appl. No. 13/177,401 (U.S. Pat. No. 8,675,346), pp. 1-11.

\* cited by examiner

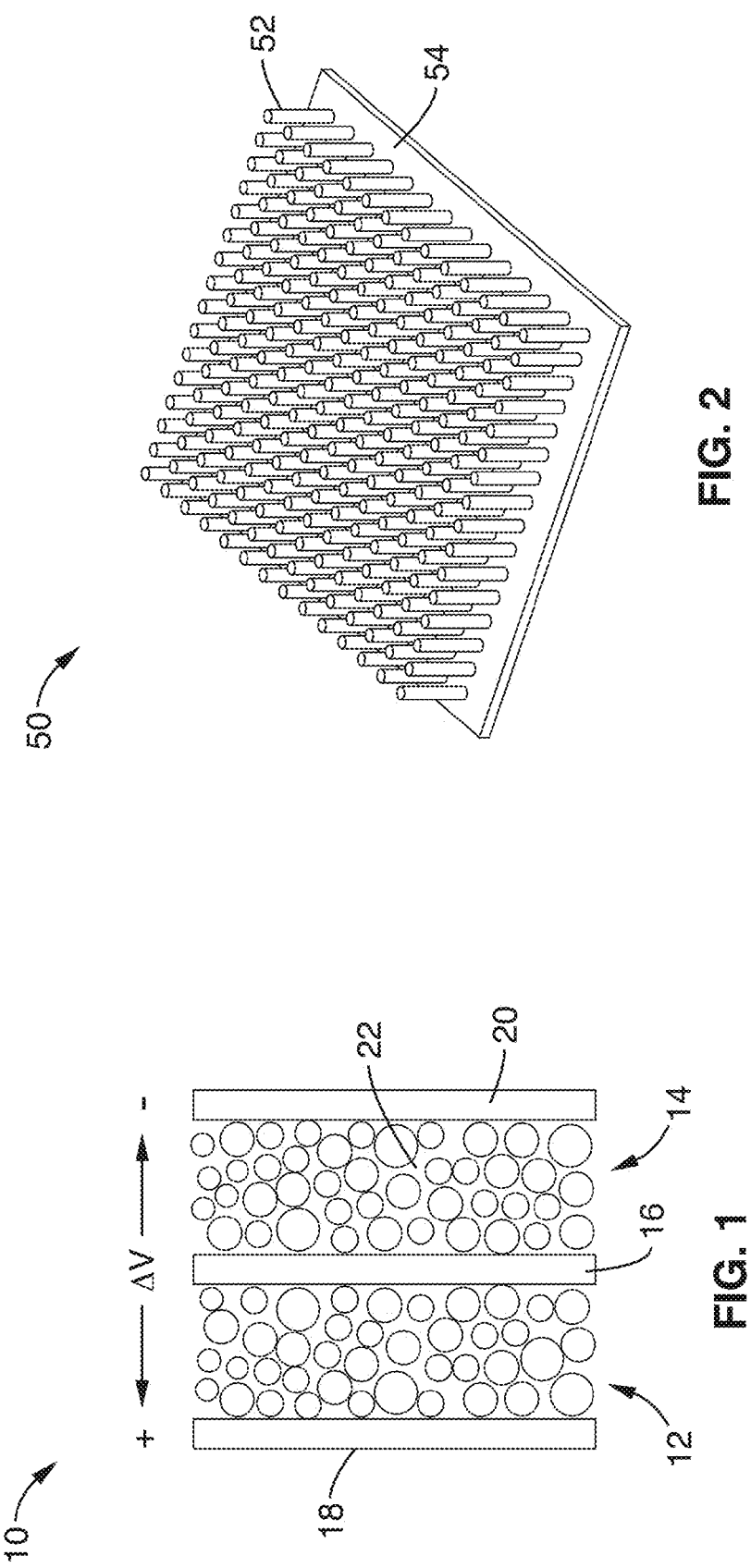

MESOPOROUS NANOCRYSTALLINE FILM ARCHITECTURE FOR CAPACITIVE STORAGE DEVICES

CROSS-REFERENCE TO RELATED APPLICATIONS

This application is a continuation of U.S. patent application Ser. No. 13/177,401 filed on Jul. 6, 2011, incorporated herein by reference in its entirety, which is a 35 U.S.C. §111(a) continuation of PCT international application serial number PCT/US2010/020572, filed on Jan. 9, 2010, incorporated herein by reference in its entirety, which in turn claims the benefit of U.S. provisional patent application Ser. No. 61/143,653 filed on Jan. 9, 2009, incorporated herein by reference in its entirety.

The above-referenced PCT international application was published as PCT International Publication No. WO 2010/144153 on Dec. 16, 2010, incorporated herein by reference in its entirety.

STATEMENT REGARDING FEDERALLY SPONSORED RESEARCH OR DEVELOPMENT

This invention was made with Government support under N00014-04-1-0410, N00014-05-1-0058 and N00014-08-1-0103 awarded by the Navy, CHE-0527015 awarded by the National Science Foundation, and DE-SC0001342 awarded by the Department of Energy. The Government has certain rights in the invention.

INCORPORATION-BY-REFERENCE OF MATERIAL SUBMITTED IN A COMPUTER PROGRAM APPENDIX

Not Applicable

BACKGROUND OF THE INVENTION

1. Field of the Invention

This invention pertains generally to charge storage devices and methods of manufacture and more particularly to charge storage devices containing thin films of nano-scale oxide materials that are mesoporous and methods of fabrication.

2. Description of Related Art

In traditional charge storage devices, there is a trade off between energy density and power density. Batteries and fuel cells offer high energy density but low power density. Capacitors, such as dielectric and electrolytic capacitors used in electronic circuits, offer high power density but have a low energy density.

Capacitive energy storage has been somewhat overlooked as an energy storage technology. The technology is based on electrochemical capacitors (ECs), which include double layer capacitors (also termed supercapacitors or ultracapacitors) and pseudocapacitors. A double layer supercapacitor (DLS) stores energy in the interface between the electrode and the electrolyte without chemical reactions taking place. Electrochemical supercapacitors (ECS) undergo electron transfer reactions during charge and discharge, and store energy through faradaic reaction processes. Pseudocapacitors represent a class of charge storage materials that undergo redox reactions like a battery material and yet respond in a capacitive fashion. With these materials, there is the prospect of maintaining the high energy density of batteries without compromising the high power density of capacitors.

One of the limiting features that prevents more widespread usage of electrochemical supercapacitors has been the relatively low energy density of the materials employed in capacitive storage applications. Currently, the field is largely based on materials made of carbon and electric double layer storage processes. A significant phenomenon occurs as electroactive materials approach nanometer-scale dimensions. The charge storage of cations from faradaic processes occurring at the surface of the material, referred to as the pseudocapacitive effect, becomes increasingly important.

Thus, in recent years, there has been considerable effort aimed at increasing specific energy without compromising specific power. One particularly popular direction has been the study of carbon materials with tailored pore sizes. An interesting development in this area is the report of an anomalous increase in capacitance for pore diameters below 1 nm.

Interestingly, continuing to increase the surface area of the carbon does not necessarily lead to increasing specific capacitance as limiting values have been observed experimentally and modeled as well. Although existing electric double layer capacitors (EDLC's) have high power capabilities, the energy density for electric double layer capacitors is well below that of batteries. The reason is that only the specific surface area of the carbon electrode contributes to energy storage while in the battery, the entire material, surface and bulk, contributes to the storage capacity.

Metal oxides are another grouping of materials that have been studied for use in electrochemical capacitors. The interest in using pseudocapacitor based materials for electrochemical capacitors is that the energy density associated with faradaic reactions is theoretically much higher, by at least an order of magnitude, than traditional double layer capacitance.

For example, hydrous ruthenium oxide ($RuO_{ss}$) has been shown to have a specific capacitance greater than 700 F/g. Interestingly, the highest values of specific capacitance do not occur with anhydrous crystalline ($RuO_2$). In the anhydrous material, the redox activity is confined to the electrode surface via adsorption of protons from solution, and specific capacitances of 380 F/g have been reported. Instead, the largest capacitive storage has been observed with the hydrous amorphous phase of $RuO_2$ as there is now the additional contribution of proton insertion into the bulk as well as the surface redox reactions. Specific capacitances with these ruthenium materials reach 760 F/g, but only at scan rates on the order of 2 mV/s. Thus, the energy density of hydrous ($RuO_2$) may be somewhat less attractive because the highest levels are achieved at the expense of a lower power density. Furthermore, there has been considerable interest in moving away from ($RuO_2$) not only because of cost issues, but also to use more environmentally friendly electrolytes than concentrated sulfuric acid.

Other transition metal oxide systems exhibit analogous behavior. For the most part, however, the various transition metal oxide systems exhibit specific capacitances in the range of 200 to 250 F/g, i.e., only 10% to 20% of their theoretical values.

Accordingly, there is a need for materials that achieve a combination of high power and energy density that are capable of multiple charge/discharge cycles that are easy to manufacture and use. There is also a need for simple fabrication methods and electrode systems. The present constructs and methods satisfy these needs, as well as others, and are generally an improvement over the art.

BRIEF SUMMARY OF THE INVENTION

The present invention relates to charge storage devices and methods of manufacture that use nano-structured materials designed to overcome the present limitations of electrochemical capacitors through the use of mesoporous transition metal oxides. Such materials allow for power densities significantly higher than those found in batteries, without compromising energy density and sacrificing the high rate charging/discharging properties of capacitors.

The typical charge storage device cell generally includes a pair of electrodes including a mesoporous thin film and charge collection plates. The fundamental cell may also be in a double layer configuration with a separator between two opposing films and charge collection plates as illustrated in the drawings.

As described herein, the term "electrode" refers to the portion of an energy storage device that physically interacts with an electrolyte to store charge such as in a polarized double layer in a supercapacitor.

The term "charge collector" refers to the electrically conductive element of an energy storage device that is in substantial physical and electrical contact with an electrode surface, and which serves to transfer charge from the electrode to an electrical contact pad. In one embodiment of an energy storage device, an electrode and a charge collector form thin films, each having essentially two planar surfaces, one of the electrode surfaces is generally in physical contact with an electrolyte while the other electrode surface is in physical and electrical contact with a charge collector surface; the contacting electrode and charge collector surfaces generally share similar perimeter dimensions. The charge collectors of the fundamental cells of like charge can be electrically connected to form arrays.

The invention provides electrode materials in novel forms. The mesoporous morphology is particularly suited for supercapacitors based on pseudocapacitance mechanisms. However, electroactive materials of the invention can be adapted to many different storage applications and are not limited to any particular metal oxides.

The invention provides transition metal oxides or equivalents with layered nanostructures that preferably provide three different charge storage components when the material is immersed in an electrolyte: (1) a non-faradaic contribution from a double layer effect; (2) cations electrochemically adsorbing onto the surface through charge-transfer processes, and (3) cations intercalating in the interlayer gaps (van der Waals gaps) through a single-phase faradaic reaction. The latter two mechanisms are pseudocapacitive effects which are often referred to as redox pseudocapacitance and intercalation pseudocapacitance, respectively. Redox pseudocapacitance arises from fast, reversible charge transfer processes occurring at the surface while intercalation pseudocapacitance involves the insertion of cations in quasi-two-dimensional planes of a layered host material. It is believed that these electrochemical intercalation processes are pseudocapacitive in nature because the cations are faradaically stored and phase transitions do not occur. The accommodation of lithium or other ions in the van der Waals gaps of layered materials is considered similar to two dimensional underpotential deposition, which represents one of the best examples of a pseudocapacitive process.

The storage devices of the present invention preferably use thin film materials with 3-dimensionally interconnected mesoporosity and highly oriented crystalline walls to deliberately enhance intercalation pseudocapacitance. This architecture should lead to higher levels of total stored charge and much faster charge/discharge kinetics since the combination of mesoporous morphology and layered structure offers an opportunity to obtain both types of pseudocapacitance.

The invention also includes the synthesis and characterization of self-assembled sol-gel and thin films, both with highly crystalline pore-solid architectures and large surface areas. Generally, molecular inorganic precursors are co-assembled with surfactants or amphiphilic block copolymers in solution to form structures such as hexagonally packed arrays of rods, or cubic close packed arrays of spheres. Subsequent condensation of the inorganic precursors results in a material with periodically arranged organic domains, surrounded by a cross-linked inorganic network. Once the inorganic phase is fully connected, the organic component can be removed to produce ordered porous solid films. The films produced by the methods possess open mesoscale architectures with either mono- or bimodal pore size distribution.

In recent years, it has been shown that thin films with well-ordered nanoscale porosity can be formed by co-assembly of inorganic oligomers with organic templates using evaporation-induced self-assembly (EISA). Despite the fact that a broad range of ordered porous materials may be made, the typical polymer-templated materials do not allow the inorganic walls to be crystallized while retaining nanoscale order. For example, it has been shown that, when mesostructured thin films with 10 to 15 nm repeat distances and 3 to 6 nm thick walls are produced, the nanoscale structure is not well preserved after crystallization, and in most cases, the porosity is ill-defined. However, with the present invention, mesoporous materials can be produced that possess both fully crystalline walls and well-ordered porosity by utilizing a templated structure with larger repeat distance and thicker pore walls.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only:

FIG. 1 is a schematic side view diagram of a double-layer capacitor cell according to one embodiment of the invention.

FIG. 2 is a perspective view of one embodiment of a charge collector with an array of vertical posts according to the invention.

DETAILED DESCRIPTION OF THE INVENTION

Figure 3:
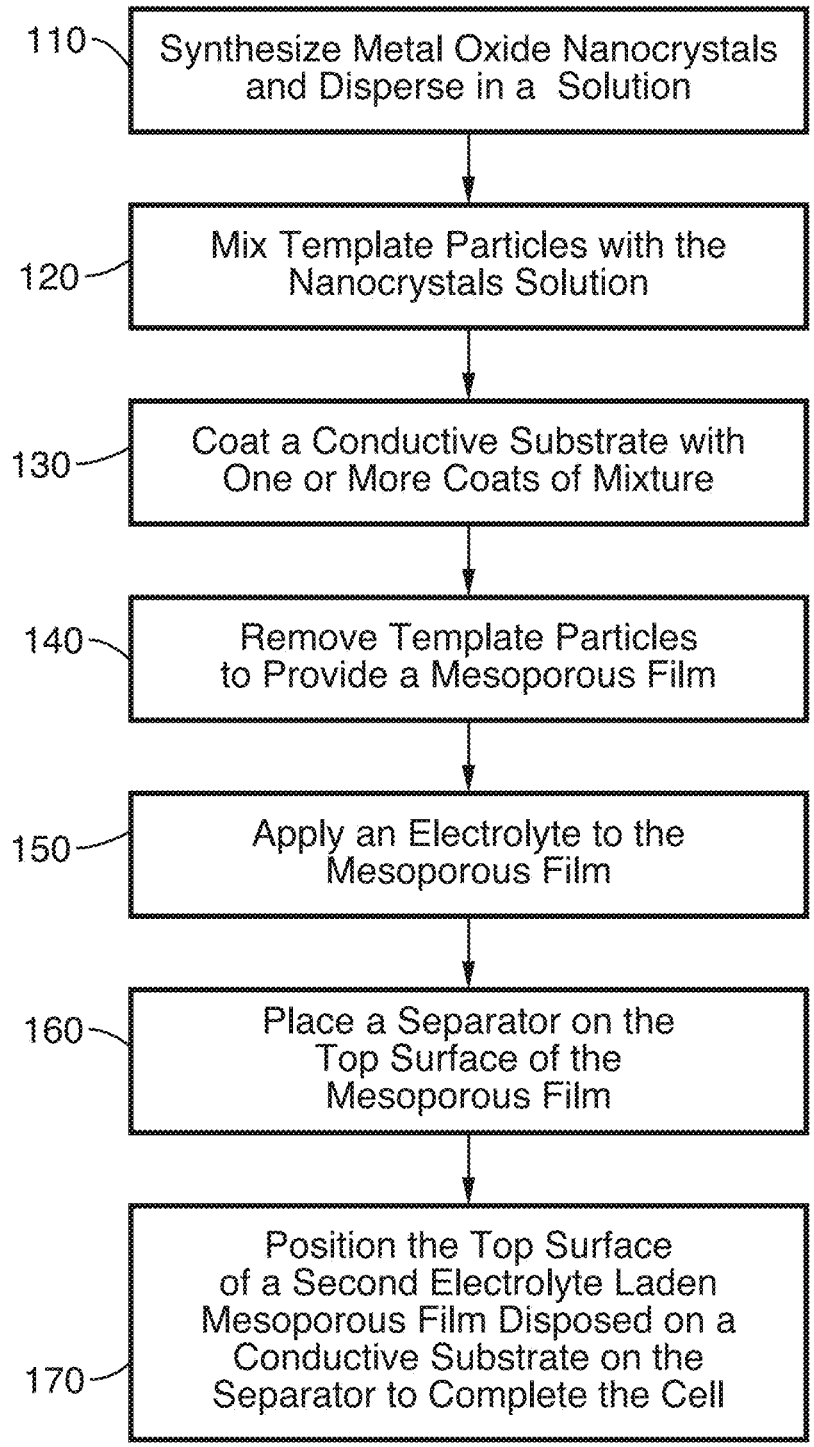
FIG. 3 is a flow diagram of a method for producing templated nanoporous electrode films.

Referring more specifically to the drawings, for illustrative purposes the present invention is embodied in the devices generally illustrated in FIG. 1 through FIG. 10 and the associated methods used to produce the devices. It will be appreciated that the devices and systems may vary as to configuration and as to the details of the parts, and that the methods may vary as to the specific steps and sequence, without departing from the basic concepts as disclosed herein.

The present invention relates to improved electrode structures for charge storage devices that have films that are mesoporous and have nanocrystalline architecture and methods of production. Although the invention is described in the context of a porous electrode metal oxide film for charge storage devices, it will be understood that the films of the present invention can be used in any application that would benefit from the porous structure.

Turning now to the apparatus diagram show in FIG. 1, one embodiment 10 of the invention is schematically shown adapted to a double-layer supercapacitor. In FIG. 1, an individual cell of a capacitor 10 is shown with two electrodes and two current collectors separated by a separator to illustrate the invention. Many individual cells 10 can be connected together to provide a modular charge storage device.

The individual supercapacitor cell 10 has a first mesoporous electrode layer 12 and a second mesoporous electrode layer 14 separated by a preferably dielectric separator plate 16. The first electrode 12 is coupled to a positive current collector 18 and the second electrode 14 is coupled to a negative current collector plate 20 in the cell embodiment shown in FIG. 1.

Normally, the non-reactive collection plates and electrodes are immersed in an electrolyte 22 which is polarized with a voltage potential that is applied across the collection plates 18, 20. The positive electrode 12 and collector 18 attract the negative ions of the electrolyte 22 and the positive ions are attracted to the negative electrode 14 and plate 20 in this illustration. The separator 16 that is positioned between the positive electrode 12 and the negative electrode 22 prevents the charge from moving between the electrodes. The electrolyte 22 can be liquid or solid (SEI) and is disposed on the surface and within the pores of the two electrode layers 12 and 14.

Generally, energy from the polarization of the electrolyte 22 is stored electrostatically at the electrode-electrolyte interface and there are no chemical reactions involved. Three different charge storage mechanisms are feasible when a material is immersed in an electrolyte: (1) cations can be stored in a thin double layer at the electrode/electrolyte interface (nonfaradaic mechanism); (2) cations can interact with the bulk of an electroactive material which then undergoes a redox reaction or phase change, as in conventional batteries (faradaic mechanism); or (3) cations can electrochemically adsorb onto the surface of a material through charge transfer processes (faradaic mechanism). The latter mechanism is a pseudocapacitive effect (often referred to as redox pseudocapacitance) because the cations are faradaically stored but do not react with the bulk of the material or require a phase change.

The electrode layers 12 and 14 are ordered mesoporous microcrystalline films of metal oxide with an architecture that permits electrolyte access and significant surface area. The architecture is also structurally flexible and resilient when the ions are present within the structure during charge and discharge events. The structure of the electrode film also provides power and energy densities that are substantially greater than seen with existing films and electrodes. The structure of the film also allows the use of thicker films due to comparatively fast solvent diffusion through the structure.

Electrode layers 12 and 14 are preferably formed from nanocrystals of a metal oxide. The films are preferably synthesized to have 3-dimensional interconnected porosity. In one synthesis method, an ethanolic solution containing pre-formed nanocrystals or a sol-gel precursor (such as tetraethyl orthotitanate) as well as a structure-directing agent is spin- or dip-coated onto a polar substrate. Upon evaporation, the system co-assembles to form a mesostructured inorganic/organic composite. This composite is then made porous by removing the template to leave the pore-solid architecture.

In the illustration shown in FIG. 1, transition metal oxides are preferred and conductive oxides are particularly preferred. However, the charge storage capacity of any oxide can be substantially improved with structured morphology provided by the invention. Exemplary oxides for nanocrystal production and synthesis include: chromium oxides, indium oxides, molybdenum oxides, niobium oxides, ruthenium oxides, titanium oxides, manganese oxides, iron oxides, nickel oxides, copper oxides, zinc oxides, vanadium oxides, cobalt oxides and tin oxides and combinations of oxides.

Efficient electron conduction through the films will permit greater film thicknesses to be increased for improved charge storage devices. One approach to effectively increase the area of the current collector is by integrating metal post arrays with the templated, nanocrystal-based porous materials. In so doing, there is the potential for increasing the total capacitance in a given area without increasing the length of the conduction path through low conductivity oxides. For example, FIG. 2 shows an embodiment of an array 50 with conductive vertical posts 52 on a charge collector plate 54. These arrays can be produced by a combination of lithographic patterning and electrodeposition. Photo assisted anodic etching and deep reactive ion etching (DRIE) can be used to produce arrays of holes with aspect ratios as high as 50 and 10, respectively. In the construction of post arrays, holes are etched all the way through a thin silicon wafer which serves as a mold. A thin metal layer is then evaporated onto one side of the hole array, followed by electroless deposition of more metal to make a robust back electrode 54. Electro-deposition of metals such as Ni, Zn, or Ag is then performed through the holes to form posts. Finally, the silicon mold is dissolved in base to release the post array. Mechanically robust posts 52 with diameters on the order of 10 μm and heights in excess of 100 μm can easily be generated to increase the area of the current collector 50.

The nanocrystal-based mesoporous films would then be deposited onto the metal posts 52 and base plate 54. Arrays with posts with approximately 10 μm diameters are preferred. To achieve homogeneous deposition onto these arrays, substrates can be immersed into the precursor solution horizontally (or nearly horizontally) so that dip coating can proceed down the length of the post 52. The introduction of the 3-D electrode array architecture has the potential of significantly increasing the capacitance per unit area of substrate.

Another approach to improved electronic conduction through the electrode films 12 and 14 is through the introduction of conductive materials to the structure such as carbon nanotubes, noble metal nanowires and nanorods of selected sizes. These types of soluble nanostructures can simply be added to the precursor solution during composite synthesis of the films. For example, the surfaces of nanowires or nanorods can be functionalized with organic ligands such as alkyl amines for the silver nanowires and alkane thiols for gold nanowires. The nature of these ligands can be varied over a broad range, and so that both hydrophobic and hydrophilic nanowires can be created that can be selectively segregated to the hydrophobic or hydrophilic component of the composite film. Similarly, polymer wrapping of carbon nanotubes with helical polymers can produce either hydrophobic or hydrophilic nanotubes, depending on the nature of the polymer. Tubes can be selectively incorporated into either the pore space or embedded into the inorganic wall. Because polymer wrapping is a non-covalent interaction, it also does not affect the conductivity of the carbon nanotubes and so it can be used with both single- and multi-walled carbon nanotubes.

A further approach is to functionalize pores with conductive material to increase the conductance of the film. A range of organic molecules exist that can be thermally decomposed into reasonably conductive carbon. Since the organic precursors are typically small molecules, they can be diffused into pores spaces after synthesis of the nanoporous metal oxides. They can then be thermally processed to generate conductive carbon within the pore space.

An alternative route to controlling the distribution of conductive carbon in the composite, is to use the templating block copolymer itself as the source for the carbon. The attractive feature of this embodiment is having the carbon effectively coat the walls of the pores throughout the entire electrode and thus provide intimate electrical contact without the possibility of clogging the pores. This approach requires a block copolymer which produces graphitic carbon upon thermal decomposition, while still retaining its polar block and amphiphilic nature to promote self-organization. One example of a hydrophobic polymer that can be effectively converted to conductive carbon is polyacrylonitrile such as Poly(ethylene oxide-block-acrylonitrile) (PEO-PAN) diblock copolymers. Polyethylene oxide polymers contain sufficient oxygen that they easily degrade at very modest temperatures, even in an inert atmosphere. As a result, the organic block can be removed at low temperatures, and then the temperature can be increased to graphitize the polyacrylonitrile block, all under inert conditions.

Referring now to FIG. 3, one embodiment of a method 100 for producing a double layer capacitor cell like the cell described at FIG. 1 is schematically shown. At block 110, metal oxide nanocrystals are synthesized and dispersed in a solution. It is preferred that the metal oxides be produced as monodisperse nanocrystals with diameters under approximately 10 nm for optimal results but may range from approximately 1 nm to 30 nm in some cases. The synthesis steps of the nanocrystals may vary based on the type of metal oxide and many production methods exist in the art that are specific for a particular oxide. In Example 1, titania nanocrystals were grown in ethanol and anhydrous benzyl alcohol under heat for nine hours.

Examples of suitable oxides for nanocrystal production or synthesis at block 110 include: chromium oxides, indium oxides, molybdenum oxides, niobium oxides, ruthenium oxides, titanium oxides, manganese oxides, iron oxides, nickel oxides, vanadium oxides, copper oxides, zinc oxides, cobalt oxides and tin oxides as well as mixtures of one or more metal oxides.

At block 120 the selected metal oxide nanocrystal solution is mixed with template particles. Surfactant templating is a powerful method for producing nanoporous or mesoporous inorganic materials. The formation of these materials relies on the solution phase co-organization of amphiphilic organic molecules and soluble inorganic precursors to produce long range periodicities. In a preferred synthesis, molecular inorganic precursors are co-assembled with surfactants or amphiphilic block copolymers in solution to form structures such as hexagonally packed arrays of rods, or cubic close packed arrays of spheres. Subsequent condensation of the inorganic precursors results in a material with periodically arranged organic domains, surrounded by a crosslinked inorganic network. Once the inorganic phase is fully connected, the organic component can be removed at block 140 to produce ordered porous solids. Carbon or metal nanotubes or nanowires or other materials can be added to the mixture at block 120 to increase the conductivity of the final film or powder crystalline structure.

The assembly of nanocrystals, rather than molecular precursors, into periodic porous arrays is preferably performed with amphiphilic block copolymers with incompatible blocks. The polar block is preferably polyethyleneglycol (PEG), which can form multidentate interactions with oxide nanocrystals. A variety of mostly alkyl non-polar blocks can also be used, including KLE and Polyisobutylene-block-Poly(ethylene oxide) [PIB-PEO].

Unlike some nanocrystals which have surfaces that are well passivated by long chain surfactants, the titania nanocrystals used in the preliminary results shown here are synthesized only in the presence of benzyl alcohol, and thus have a fairly reactive surface containing hydrolyzable benzyl alkoxides. In the presence of a polar polymer such as poly(ethylene glycol) (PEG), these benzyl groups can be effectively replaced by multidentate interactions from the polymer. The result is that the titania nanocrystals associate with the polar portion of the amphiphilic polymer template. For conventional long chain alkane terminated nanocrystals, the well passivated surface makes the nanocrystal quite hydrophobic and so it tends to associate with the hydrophobic core of the polymer or surfactant micelle.

However, well capped particles associate with the hydrophobic core of the micelle and thus do not form interconnected networks upon removal of the surfactant. Most of the nanocrystals discussed above have these highly hydrophobic surfaces as well as passivated surfaces that are needed during synthesis to control nanocrystal size and prevent agglomeration. To assemble these well capped nanocrystals using diblock copolymers, the surface ligands need to be replaced with alkoxide groups similar to those on the titania nanocrystals presented in Example 1.

The result of templating is a material with a controllable structure and porosity on the 2 nm to 30 nm length scale. Because of the high degree of chemical control available, the periodic repeat distance, the inorganic wall thickness, the nanoscale symmetry of the pores, and the wall material can all be varied essentially independently. Moreover, because of the homogeneous, interconnected porosity, these materials show mechanical properties that are significantly better than typical aerogel type porous materials. For example, the fractal geometry of aerogels means that the capillary forces which develop upon solvent filling and evaporation can easily collapse the pores.

In contrast, the pores of the synthesized material are sturdy and do not collapse, a fact that is important for electrochemical properties. Aqueous solvents also do not disrupt the nanometer scale periodicity as long as pH conditions are chosen to avoid oxide solubility.

Porosity is a principal contributor to surface area which is of vital importance for capacitor materials based on the double layer charge storage mechanism. Because of the highly regular porosity that is produced, the pore size and geometry can be adjusted to optimize the pseudocapacitor properties of metal oxides. Wall thickness and structure can be controlled by varying the ratio of block copolymer to nanocrystal in the synthesis solution which can selectively vary pore diameter between approximately 2 nm and about 25 nm. From an electrochemical standpoint mesopores of these sizes are also electrochemically accessible for both aqueous and non-aqueous electrolytes. The characteristics of the selected template particles will also change the characteristics of the resulting well-defined, highly periodic, mesoporous architectures.

The mixture solution created at block 120 can be coated on a conductive substrate such as a current collector as a thick or thin film at block 130. Multiple coatings of the mixture may be applied to obtain the desired film thickness on the substrate. Alternatively, the solution can be evaporated to produce a powder that can be used to form electrode layers. The films may be aged for several hours to avoid the loss of mesoscale ordering during crystallization.

At block 140 of FIG. 3, the template particles within the organized crystalline structures are removed. This is accomplished by thermal treatment of the applied films with temperatures ranging between 400° C. and 650° C. Films are normally calcined and the template particles removed at approximately 600° C. with a one to two hour ramp up.

If the electrolyte that is selected for the system is in solid form rather that liquid, the electrolyte can be applied at block 150 to the surface of the film after the template particles are removed to produce the mesoporous bulk or thin film at block 140. Otherwise, the completed capacitor structure can be submerged in electrolyte liquid when the apparatus is completed in one embodiment. In both instances, the electrolyte should dissolve into the porous structure of the film in this embodiment.

The electrode thin or bulk film coated on a charge collector may alternatively be placed on a substrate support.

To produce the supercapacitor structure of FIG. 1, a separator is placed on the surface of the mesoporous film at block 160. The separator is preferably a dielectric plate that restricts the flow of charge across the plate.

A second electrode and charge collector combination is joined to the separator plate at block 170 to provide the symmetrical structure shown in FIG. 1. Although a double layer capacitor was used as an illustration, it will be seen that the controlled mesoporous nanocrystalline architecture that can be produced can be adapted to many different devices where surface area, pore size and accessibility are needed.

Figure 4:
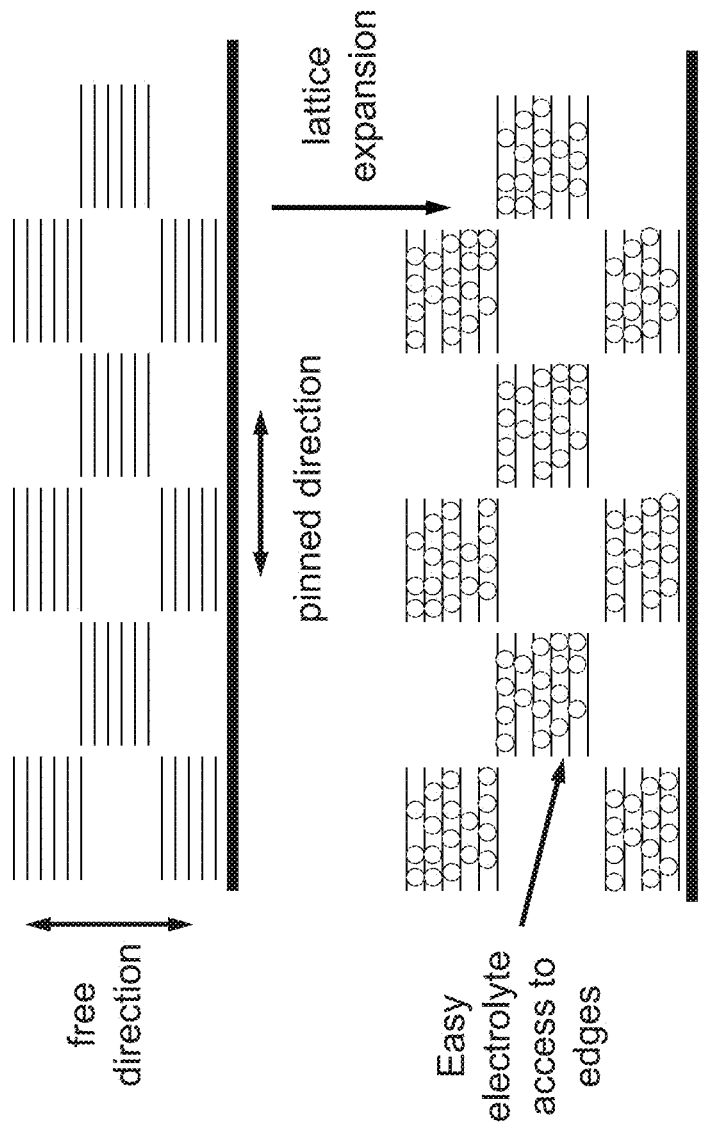
FIG. 4 is a schematic side view of a templated nanoporous electrode film showing lattice expansion.
Figure 5:
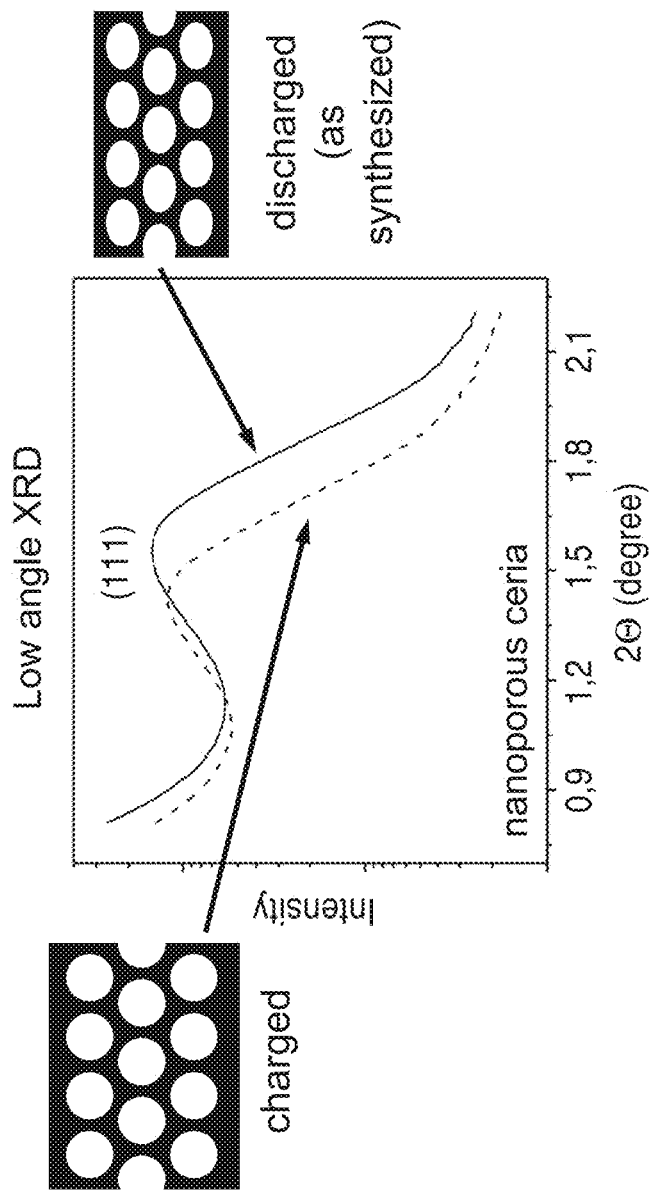
FIG. 5 is a graph showing lattice flexion with lithium ion intercalation.
Figure 6:
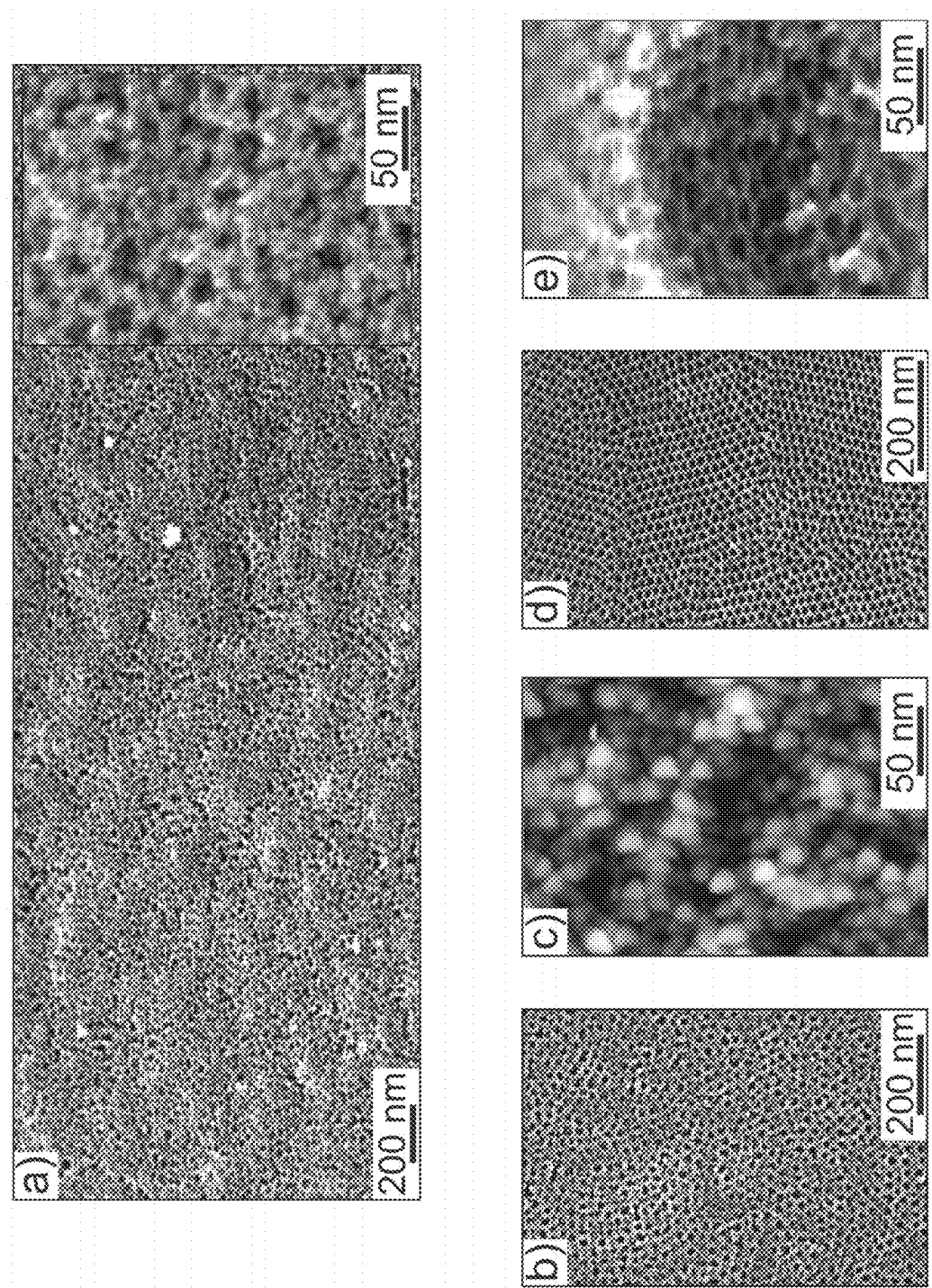
FIG. 6 is a set of micrographs of anatase titanium oxide thin films illustrating the mesoporous structure.

Another benefit of the well-defined, highly periodic, mesoporous architectures that are provided is mechanical flexibility of the structures. In bulk materials, the strain associated with partial Li+ or other ion incorporation has been shown to inhibit further intercalation. As seen in FIG. 4 and FIG. 5, mesoporous networks, however, can be modeled as a nanotruss architecture. The ability to flex the framework of a metal oxide can be quite favorable for Li+ incorporation as changes in the nanoscale structure can be used to accommodate the strain associated with intercalation processes. The ability to flex during charge and discharge events contributes to the longevity of the material as a capacitor electrode.

The invention may be better understood with reference to the accompanying examples, which are intended for purposes of illustration only and should not be construed as in any sense limiting the scope of the present invention as defined in the claims appended hereto.

Example 1

In order to demonstrate the functionality of the polymer templated sol-gel and templated nanocrystal thin films, titanium oxide thin films were synthesized and characterized. Anatase $TiO_2$ nanocrystals were produced using a facile, surfactant-free synthesis in benzyl alcohol. In this example, 0.5 ml of $TiCl_4$ was slowly added to 2 ml of EtOH and then combined with 10 ml of anhydrous benzyl alcohol in a water-free container. The container was loosely sealed and the solution was heated at 80° C. for 9 hours. Then, 1 ml of the resulting suspension was precipitated in 12 ml of diethyl ether and centrifuged at 5000 rpm to isolate the nanoparticles from solvent and unreacted precursor. Finally, the resulting white powder was dispersed in 3 ml of EtOH and sonicated for 2 hours, yielding a transparent sol.

According to wide-angle X-ray diffraction (WAXD), the synthesized nanoparticles were crystalline with an average grain size of 4-5 nm. Both, position and relative intensity of WAXD peaks were consistent with the JCPDS (Joint Committee on Powder Diffraction Standards) reference card for tetragonal anatase [card no.: 21-1272].

For the synthesis of films with 3-dimensionally interconnected porosity, an ethanolic solution containing preformed nanocrystals or a sol-gel precursor (e.g. tetraethyl orthotitanate) as well as a structure-directing agent was spin- or dip-coated onto a polar substrate. Upon evaporation, the system co-assembled to form a mesostructured inorganic/organic composite. This composite was then made porous by removing the template to leave the pore-solid architecture. In this illustration, KLE block copolymers (poly(ethylene-co-butylene)-block-poly(ethylene oxide) as organic templates were used, which have been shown to possess superior templating properties. These block copolymers are suitable for synthesizing large-pore metal oxide thin films with crystalline pore walls. In this example, $TiCl_4$ (99.9%) and anhydrous benzyl alcohol (99.8%) were purchased from Sigma-Aldrich. $H(CH_2CH_2CH_2(CH)CH_2CH_3)89$ $(OCH_2CH_2)79$ OH (referred to as KLE22) and $H(CH_2CH(CHCH_2)310$ $(OCH_2CH_2)560$ OH (referred to as KLE23) were utilized as organic templates.

Mesoporous sol-gel films were synthesized with 600 mg of $TiCl_4$ carefully combined with 3 ml of EtOH in a container. After 30 min, 100 mg of KLE22 dissolved in 3 ml of EtOH and 500 mg of double distilled $H_2O$ were added to the mixture. Thin films were produced via dip-coating on polar substrates. Optimal conditions for the films include 20% ambient relative humidity and a constant withdrawal rate of 1-10 mm/s. The films were then aged at 300° C. for 12 hours to prevent loss of mesoscale order over the course of crystallization.

Mesoporous nanocrystal films were synthesized using 60 mg of KLE22 and KLE23, respectively, dissolved in 0.5 ml of EtOH that was added to 4 ml of the anatase nanocrystal solution (nanoparticle content of about 13-15 mg/ml). Once the solution was homogeneous, 200 mg of double distilled H₂O was added. Thin films were produced via dip-coating at 30% relative humidity. Calcination of the composite to fully remove the polymer template was done using a 2 hour ramp up to 600° C., followed by a 1 hour soak. Nontemplated nanocrystal-based films were produced without any template but under otherwise identical conditions for purposes of comparison.

The thickness of a mesoporous film produced by spin- or dip-coating is only around 100 nm due to the relatively low $TiO_2$ particle content in the sol. However, multiple dip-coating is a possibility to achieve films thicknesses of greater than 500 nm.

The nanoscale structure of self-organized anatase $TiO_2$ thin films is shown in FIG. 6a through FIG. 6e. Low-magnification top-view FESEM images of KLE23 templated nanocrystal film is shown in FIG. 6a and KLE22 templated nanocrystal film is shown in FIG. 6b. The inset in FIG. 6a shows a high-magnification top-view FESEM image. It can be seen that the porosity is bimodal with 1-4 and 20-25 nm diameter pores in FIG. 6c in the tapping mode AFM image of a templated nanocrystal film calcined at 900° C. FESEM images of a KLE22-templated sol-gel film held at a lilt of 45° of the top surface of the film is shown in FIG. 6d and in cross section in FIG. 6e.

For electrochemical measurements, thin films were deposited on ITO-coated glass and thermally treated at 600° C. According to X-ray diffraction, the sol-gel $TiO_2$ films feature 13-14 nm nanocrystals in the pore walls, whereas the nanocrystal films are comprised of 8 nm anatase particles.

Cyclic voltammetry (CV) was used to analyze the charge storage behavior of the mesoporous $TiO_2$ thin films. Cyclic voltammograms of a KLE22 templated nanocrystal film acquired at various sweep rates were obtained. The lithium insertion/extraction into or from the anatase film occurred at around 1.7 and 2.0 V vs. Li/Li+, respectively. The area under the CV curves represented the total amount of stored charge which arises from both, faradaic and non-faradaic processes. The total stored charge was separated into three components: the faradaic contribution from the Li+ insertion process, the faradaic contribution from the charge transfer process with surface atoms (referred to as pseudocapacitance), and the nonfaradaic contribution from the double-layer effect. It was observed that the amount of stored charge was strongly dependent upon the sweep rate that ranged between 0.5-20 mV/s.

Comparison of the templated films to the untemplated nanocrystal film indicated that the introduction of interconnected porosity enhances the electrochemical charge/discharge properties by (1) minimizing solid-state diffusion path lengths and (2) facilitating mass transport of ions and solvent to the electrochemically active sites. Furthermore, certain minimum mesopore sizes are needed to allow for a reasonable molecular transport of ions through the inorganic network. For this reason, both templated films feature significantly better electrochemical performances than untemplated nanocrystal films, indicating that the pores between the nanocrystals are not sufficiently large to allow solvent access to the bulk of the film.

When comparing all three films, the total amount of charge stored in the KLE-templated nanocrystal films were observed to be highest and the charging/discharging rates were fastest because the surface of the individual nanocrystal building blocks remains accessible to the electrolyte and the large pores provide a pathway for solvent diffusion through the film. In the case of the KLE-templated sol-gel films, the absence of bimodal porosity and the accompanied reduction in surface area impedes the insertion processes.

At a relatively low sweep rate (0.5 mV/s), both types of templated mesoporous films demonstrated much higher insertion capacities than seen in the untemplated nanocrystal films. This result indicated that the introduction of three-dimensionally interconnected mesoporosity significantly enhances the insertion processes by providing short diffusion path lengths and easy diffusion of the electrolyte. The total stored charge was about half-capacitive for both of the nanocrystal-based materials. In contrast, only ⅓ of the stored charge was capacitive for the sol-gel material. The KLE-templated nanocrystal films showed both the highest amounts of total stored charge and the highest capacitive charge storage.

In comparison, both the capacitance and insertion capacity of the templated sol-gel films were lower. However, thermal treatment of the sol-gel $TiO_2$ films at 650° C. lead to a rise in both insertion capacity and capacitance by roughly 20%, presumably due to grain restructuring in the sol-gel that opened space between cage pores enhancing interconnectivity and facilitating solvent diffusion through the film. The untemplated nanocrystal films showed a much lower total charge storage capacity. This is likely because the pores between the nanocrystals are not sufficiently large to allow solvent access to the bulk of the film and so only some fraction of the film near the liquid interface is electrochemically active.

The disparity in charge storage for the different materials was even more pronounced at higher sweep rates (10 mV/s). The capacitive charge storage was basically unaffected by the increase in scan rate, while the insertion capacity dropped significantly. The observed invariance of the capacitive values was due to the fast kinetics of both double-layer and pseudocapacitive processes. The slow diffusion of lithium ions in $TiO_2$ resulted in a dramatic reduction in insertion capacity at the scan rate of 10 mV/s compared to the 0.5 mV/s because there is simply less time for Li+ to diffuse into the titania network.

It was also observed that the total stored charge of the templated nanocrystal films was nearly 2.5 times higher than the stored charge of the templated sol-gel films. The electrochemical performance of the templated sol-gel films was comparable to untemplated nanocrystal-based $TiO_2$ films. The amounts of stored charge arising from capacitive effects were notably higher than those from Li+ insertion alone.

Overall, the results demonstrated that templated nanocrystal architectures allow for high rate charging/discharging because about 65% of the total stored charge is capacitive at a sweep rate of 10 mVIs.

Example 2

To further demonstrate the viability of nanocrystal thin film pseudocapacitors, cubic mesoporous molybdenum oxide ($MoO_3$) thin films with iso-oriented nanocrystalline grains were produced and characterized. These films were produced using a poly(ethylene-co-butylene)-b-poly(ethylene oxide) block copolymer (also referred to as KLE), which has been shown to strongly facilitate the conversion of the initially amorphous framework into a highly crystalline material. It was shown that the anisotropic distribution of atoms in the unit cell of molybdite (α-MoO) allows the production of films with crystallographically oriented nanocrystals in the pore walls.

Orthorhombic α-$MoO_3$ is an electroactive 2-dimensional layered material which can accommodate up to 1.5 Li+/Mo. It is made of alternately stacked layers held together by weak van der Waals forces along [010]. The pseudocapacitive characteristics of ordered mesoporous α-MoO₃ films were observed and shown to exhibit a superior charge storage capacity compared to mesoporous amorphous and non-templated crystalline MoO₃. It was also observed that the insertion of Li+ in the quasi-two dimensional planes, the intercalation pseudocapacitance, was responsible for the higher level of charge storage and that it occurs at much faster rates with mesoporous α-MoO3 as compared to other materials.

The mesoporous MoO₃ thin films were synthesized using an evaporation-induced self-assembly process. Generally, an ethanolic solution containing a sol-gel precursor (MoCls) and structure-directing agent (KLE) was dip-coated onto a polar substrate. Upon evaporation of the solvent, the system co-assembles to form a mesostructured inorganic/organic composite. This composite is then made porous by thermal treatment to leave the pore-solid architecture.

In this example, 0.08 grams of material referred to as KLE22 H(CH₂CH₂CH₂(CH)CH₂CH₃)89 (OCH₂CH₂)79 OH was dissolved in 4 ml of EtOH and combined with 0.4 grams of MoCl5 in a water-free container. Once the solution was homogeneous, 0.2 grams of double distilled H₂0 was added. Thin films were produced via dip-coating on polar substrates. Optimal conditions included 15-25% relative humidity and a constant withdrawal rate of 1-10 mm/s. The films were aged at 200° C. for 12 hours prior to template removal to prevent loss of mesoscale order over the course of crystallization. The films were then calcined in oxygen using a 1 hour ramp to 450 DC followed by a 10 minute soak.

Both transmission electron microscope (TEM) atomic force microscopy (AFM) imaging of the thin films after removal of the KLE template and crystallization at 450° C. show cubic pore-solid architecture without major structural defects with regular open pores. The initially amorphous pore-solid architecture can be crystallized while retaining mesoscale order and that α-MoO3 with a high degree of crystallographic orientation can be readily produced on virtually any substrate by soft solution-processing routes.

Figure 7:
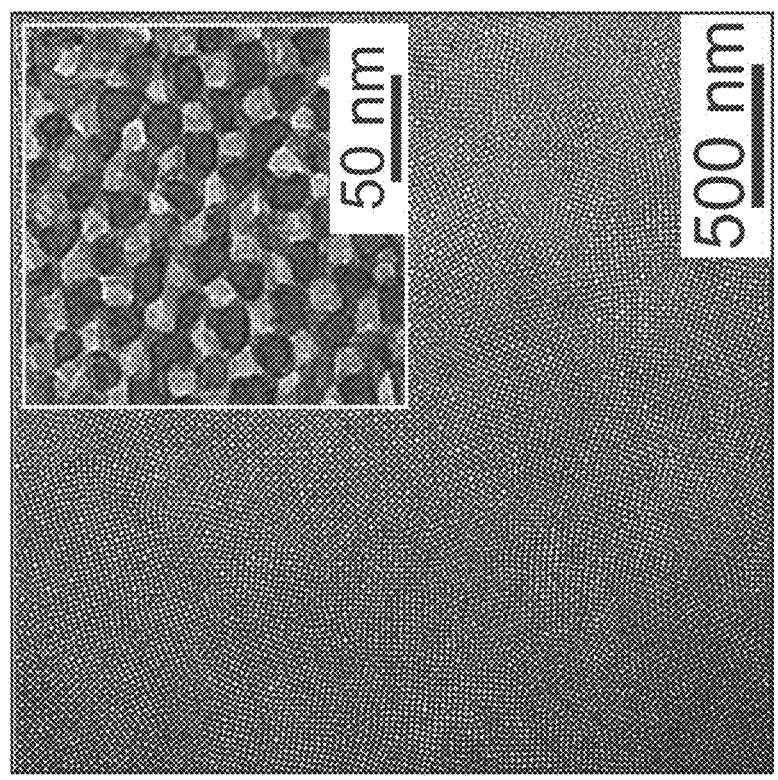
FIG. 7 is a set of micrographs of molybdenum oxide thin films illustrating the mesoporous structure.
Figure 8:
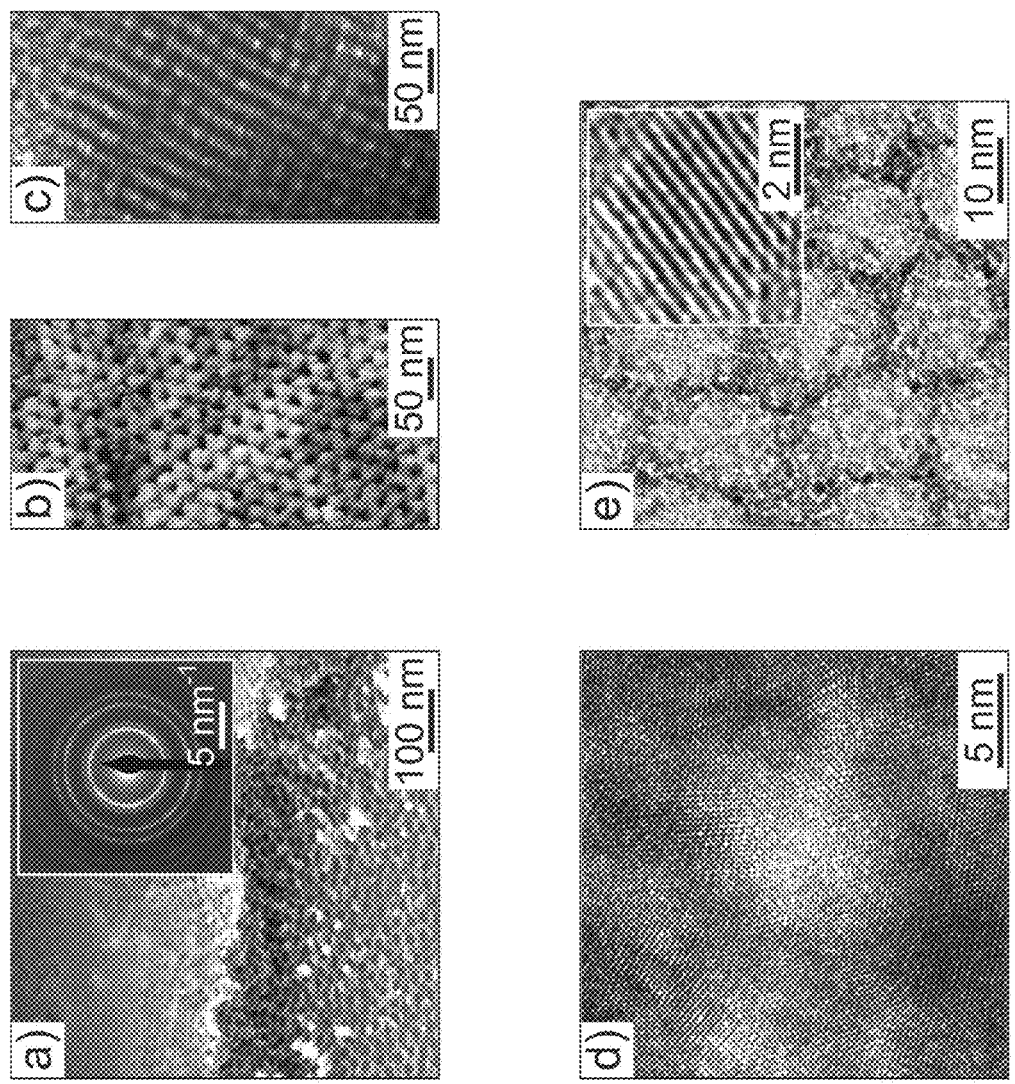
FIG. 8 is a set of micrographs of ceria thin films illustrating the mesoporous structure.

The morphology of mesoporous α-MoO₃ with highly oriented crystalline walls is shown in the low-magnification bright-field TEM micrograph and higher magnification micrograph in the inset of FIG. 7.

To study the crystallization behavior, in particular the oriented crystal growth in the pore walls, various wide-angle X-ray diffraction (WAXD) measurements were performed. The crystallization of the amorphous α-MoO₃ framework occurs at around 400° C. in a narrow temperature interval. The diffraction results also showed only three distinct peaks, namely the (020), (040) and (060) reflections of α-MoO₃. The absence of other reflections indicates pronounced crystallographic orientation relative to the plane of the substrate, perpendicular to the [010] axis of molybdite. By contrast, films produced without any polymer template reveal virtually no preferred orientation.

A similar degree of crystallographic orientation can also be obtained for other metal oxides with rectangular unit cells such as T-NbzOs (orthorhombic). Oxides with lower structural anisotropy like anatase TiOz (tetragonal), by contrast, reveal a negligible nanocrystal orientation under comparable conditions.

Accordingly, the deposition via spin-coating or dip-coating produces an amorphous metal oxide film with polymer being located between the inorganic layer and the substrate. Mediated by polymer, polar substrates induce a polarization in the metal oxide layer parallel to the plane of the substrate. For systems with strongly anisotropic unit cells, the polarization coincides with a maximum van der Waals attraction to the surface and leads to an oriented nucleation and growth of nanocrystals upon thermal treatment. The finding that the nanocrystals also align with respect to one another can be explained by the fact that the mutual interaction of objects with directional van der Waals force is maximal for iso-oriented arrays. This crystallization behavior is referred to as "soft epitaxy" since the mechanism and growth mode are distinctly different from classical liquid phase epitaxy.

To examine the redox processes present in the sol-gel derived films, solution based voltammetry experiments at various sweep rates were performed. Electrochemical experiments were performed in a three-electrode cell using a PAR EG&G 273 Potentiostat. The working electrode was ITO glass upon which the MoO₃ films were deposited. Lithium wires were used as reference and counter electrodes. The electrolyte solution was 1.0 M LiClO₄ in propylene carbonate (PC). All measurements were performed in an argon filled glove box using cut-off voltages at 3.5 V and 1.5 V vs. Li/Li+.

Cyclic voltammograms for mesoporous amorphous and crystalline films as well as for a bulk crystalline film produced without any polymer template but under otherwise identical conditions were produced. The mesoporous amorphous films revealed a featureless voltammetric response over a broad potential range. This response arises from the disorder of the amorphous pore wall structure which leads to numerous sites spread over a wide variation in energies. In contrast, the mesoporous crystalline films show well-defined redox peaks due to multistep insertion/extraction.

Additionally, the amount of stored charge was found to be strongly dependent upon film morphology. At a sweep rate of 1 mV/s, the charge storage is calculated to be 650 C/g and 460 C/g for mesoporous crystalline and amorphous films, respectively. By comparison, non-templated films display a charge storage of only 330 C/g at the same sweep rate, which demonstrates that the introduction of 3-dimensional interconnected porosity significantly enhances electrochemical properties as the combination of electrolyte access and short diffusion path lengths for both electronic and Li+ transport provides a beneficial microstructure for Li+ insertion/extraction.

The total stored charge was also observed to be dependent upon sweep rate. Regardless of the sweep rate, however, the total charge stored in mesoporous crystalline films was significantly higher compared to amorphous ones. For example, after a charging time of 100 seconds, the amount of stored charge is about 45° C./g for the mesoporous crystalline films while only 180 C/g is stored in the case of amorphous films. Overall, the results showed that KLE-templated MoO₃ thin films possess significantly higher charge capacities and faster charging/discharging rates than non-templated films. Also, the fact that mesoporous α-MoO₃ exhibits superior properties compared to amorphous films of the same composition suggests that the crystalline samples strongly benefit from the layered structure of the molybdite.

Overall, the total stored charge of the films can be separated into three components: the faradaic contribution from the Li+ insertion, the faradaic contribution from charge transfer processes with surface atoms and with atoms located in the interlayer lattice planes (referred to as pseudocapacitance), and the non-faradaic contribution from the double layer effect. The net result is that iso-oriented, mesoporous films represent a new class of pseudocapacitive materials which offer increased energy density while still maintaining its high power density advantages.

Example 3

The synthesis and characterization of highly ordered mesoporous $CeO_2$ films with crystalline walls and periodic nanoscale porosity was conducted to demonstrate the electrochemical properties as well as the mechanical properties of these films to illustrate how pore flexing can be used to facilitate intercalation of lithium ions.

Unlike many traditional battery materials, however, $CeO_2$ does not have a layered or tunnel structure. As a result, electrochemical redox reaction rates in the bulk material are quite slow, which limits its usefulness for electrochemical charge storage devices. While ceria is a redox-active material, bulk $CeO_2$ is not a useful material for charge storage because it displays low capacity and slow kinetics. In mesoporous form, however, both insertion capacity and pseudocapacitance increased significantly. Accordingly, nanoscale porosity was used to convert a nonactive metal oxide into an active one.

Mesoporous film samples were prepared by dip-coating using a large poly(ethylene-co-butylene)-bpoly(ethylene oxide) diblock co-polymer (also referred to as KLE) as the organic template. The use if this template allowed for the formation of cubic architectures with 20 nm to 30 nm pore-to-pore distances and 10 nm to 15 nm thick walls. These thicker walls allow for the formation of stable crystallites without the need to distort the pore network to accommodate crystallization and grain growth. It was established that the films have a mesoporous network with a biaxially distorted cubic pore structure and are highly crystalline at the atomic scale when heated to temperatures above 500° C.

In a typical film synthesis, 100 mg of KLE was dissolved in 4 mL of EtOH and combined with 600 mg of $CeCl_3\ 7H_2O$. Once the solution was homogeneous, 200 mg of double distilled $H_2O$ was added. Thin films were produced via dip-coating on polar substrates in a controlled environment. The substrates included fused silica, fluorine-doped $SnO_2$ glass, (100)-oriented silicon wafer, and platinized silicon wafer. Optimal conditions occurred with 15% relative humidity and a constant withdrawal rate of 1 to 10 mm/s. Films were calcined using a 1 hour ramp to 600° C. followed by a 10 min soak. Non-templated $CeO_2$ films were produced without any KLE but under otherwise identical conditions.

FIG. 8a is a field emission scanning electron microscope (FESEM) image taken at a 45° tilt of a cut in a KLE-templated $CeO_2$ film. This micrograph shows a cubic architecture with 14 nm diameter pores and emphasizes the homogeneity of the three-dimensional interconnected structure. Moreover, it can be observed that the films are crack-free, which suggests that nanoscale ceria effectively withstands the stress that develops over the course of thermal treatment, especially that arising from crystallization of the initially amorphous pore walls. The homogeneity of the self-organized samples employed in this work is also evident from atomic force microscopy (AFM, FIG. 8b) and transmission electron microscopy (TEM, FIG. 8c). The tapping-mode AFM image in FIG. 8b further shows that the pores at the air-solid interface are open and that the top surface is fairly flat; the root-mean square (rms) roughness is less than 2 nm. From high resolution TEM (HRTEM, FIG. 8d) and electron diffraction (FIG. 1a, inset), it was established that the sub-15 nm thick pore walls are highly crystalline with randomly oriented cerianite grains. FIG. 8e is a high-magnification TEM image of an ultrathin KLE-templated film with 16 nm to 18 nm diameter pores arranged on a two-dimensional lattice. The film thickness is only 9 nm. A HRTEM image of a single cerianite grain is shown in the inset.

The relationships among surface area, charge storage capacity, and charge/discharge rates were examined and compared to nontemplated samples. Electrochemical impedance spectroscopy measurements were used to gain additional insight regarding double-layer and pseudocapacitive contributions.

Figure 9:
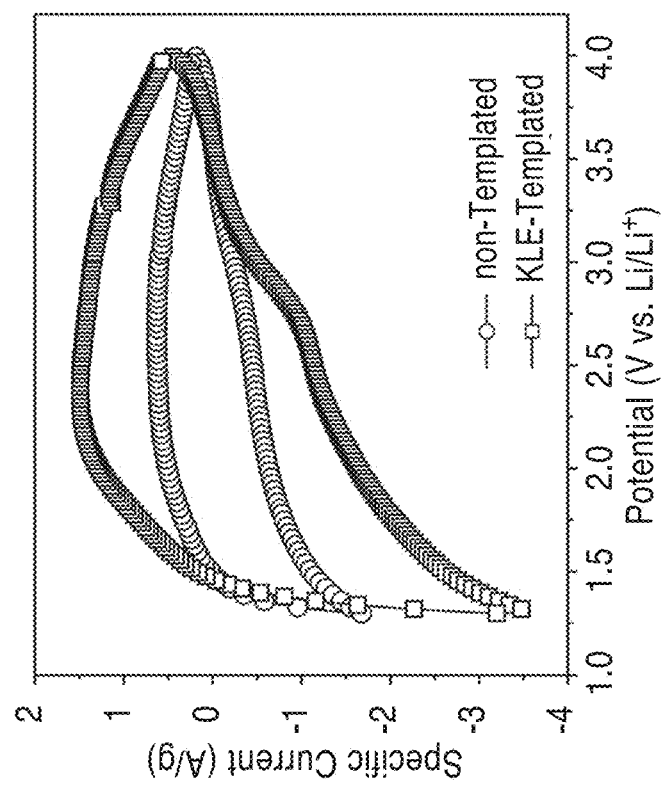
FIG. 9 is a graph showing voltametric responses of KLE-templated and nontemplated ceria films.

FIG. 9 shows the gravimetrically normalized cyclic voltammetric responses for KLE-templated and nontemplated $CeO_2$ films at a sweep rate of 20 mV/s. The area under the CV curves represents the total amount of stored charge, which arises from both faradaic and nonfaradaic processes. FIG. 9 clearly indicates that the charge storage is strongly dependent upon film morphology.

Figure 10:
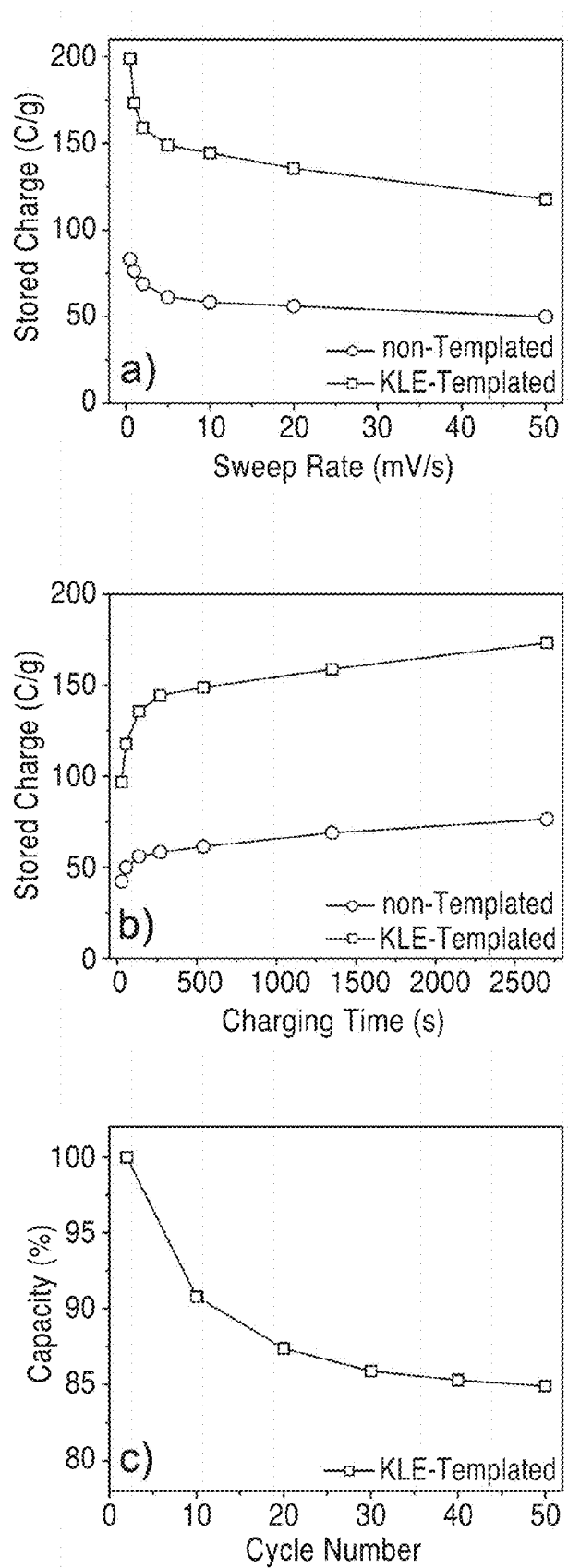
FIG. 10 is a set of graphs showing charge storage dependence on sweep rate for KLE-templated and nontemplated ceria films.

The total charge storage was also observed to be strongly dependent upon sweep rate as seen in FIG. 10. With decreasing sweep rate, the amount of charge stored increased, which implies that full storage has not been achieved because of kinetic limitations associated with the diffusion of Li+ through the bulk of the films. Regardless of the sweep rate, however, the magnitude of total charge storage (gravimetrically normalized) for mesoporous $CeO_2$ is approximately 2.5 times larger than that of the bulk films. For example, at a sweep rate of 0.5 mV/s (charging time of 5400 seconds), the mole fraction of stored lithium is calculated to be 0.35 (198 C/g) and 0.14 (83 C/g) for mesoporous and nonporous materials, respectively. By comparison, after only 54 seconds of charging (sweep rate of 50 mV/s), the mesoporous and nonporous films have stored 120 and 50 C/g, respectively. KLE-templated $CeO_2$ samples also showed very good cycling characteristics with a capacity fade of only 14% to 15% after 50 cycles.

Taken together, the results demonstrated that the introduction of periodic nanoscale interconnected porosity significantly enhances electrochemical charge storage properties and leads to faster charge/discharge kinetics. The combination of electrolyte access through the interconnected mesoporous network and short diffusion path lengths for both electronic and ion transport provides a beneficial microstructure for Li+ insertion/extraction and the accompanying redox reaction.

Lastly, X-ray diffraction measurements were used to examine the mechanical changes that result from the intercalation of lithium ions into the cerianite lattice. By correlating mechanical changes with redox activity, it was possible to identify some of the unique advantages of using porous architectures for electrochemical materials.

The slow lithium ion intercalation kinetics of bulk ceria arises from the fact that the $CeO_2$ crystal structure contains neither van der Waals gaps nor one-dimensional tunnels where lithium ions can easily diffuse and be stored. To accommodate Li+ intercalation, expansion of the ceria lattice is needed, and this structural change is a kinetically slow process. Moreover, in bulk materials, the strain associated with partial Li+ incorporation inhibits further intercalation. Mesoporous networks, however, can be modeled as a nano-truss architecture. The ability to flex the framework of a metal oxide can be quite favorable for Li+ incorporation as changes in the nanoscale structure can be used to accommodate the strain associated with intercalation processes.

Ceria was an ideal system for studying these effects for two reasons. In the first place, the large lattice strains that occur upon intercalation should produce significant changes in nanoscale structure that can be easily measured. Second, the highly periodic nature of the mesoporous ceria used here facilitates structural characterization of the pore architecture.

To examine the expansion that results from the intercalation of lithium ions into the ceria lattice, one dimensional small-angle X-ray diffraction (1D-SAXS) measurements were carried out. While changes in pore structure are usually rather difficult to measure, the ordered pore-solid architecture provided an opportunity to follow small changes in the periodic system. The fully lithiated film revealed a significant shift in the peak position to lower angle or larger repeat distance. This expansion of the nanoscale periodicity is used to accommodate the atomic-scale expansion of individual ceria grains upon intercalation of Li+. The overall result was an expansion of about 10% in the periodicity of the film normal to the substrate. Interestingly, this expansion did not result in the loss of order as the peak intensity was only slightly decreased.

The net result was that mesoporous $CeO_2$ films exhibited reasonable levels of pseudocapacitive charge storage and much higher capacities than samples prepared without any polymer template. Part of this increased capacity stems from the fact that these films are able to expand normal to the substrate upon intercalation of lithium ions by flexing of the nanoscale pores. This flexing relieves stress from volume expansion that normally inhibits charge storage. Overall, the results described in this example provide fundamental insight into how nanoscale structure and mechanical flexibility can be used to increase charge storage capacity in metal oxides.

From the foregoing it can be seen that the present invention can be embodied in various ways, including, but not limited to, the following:

1. A charge storage device comprising a nanostructured, mesoporous material.

2. A charge storage device according to embodiment 1, wherein the material is selected from the group of materials consisting essentially of metal oxides, transition metal oxides, and mixed metal oxides.

3. A charge storage device according to embodiment 1, wherein the material comprises titanium dioxide ($TiO_2$).

4. A charge storage device according to embodiment, wherein the material exhibits three-dimensionally interconnected mesoporosity.

5. A charge storage device according to embodiment 1, wherein the material comprises a mesoporous structure with either mono- or bimodal pore size distribution.

6. A charge storage device according to embodiment 1, wherein the material comprises a thin film, or a powder, or a monolith.

7. A charge storage device according to embodiment 1, wherein the material comprises a film having grains oriented to alleviate strain associated with charging and discharging.

8. A charge storage device according to embodiment 1, wherein the material comprises a monolith having grains oriented to alleviate strain associated with charging and discharging.

9. A charge storage device, comprising a nanostructured, mesoporous material; and a nanoscale conducting material in contact with the nanostructured, mesoporous material.

10. A charge storage device according to embodiment 9, wherein the nanostructured, mesoporous material is selected from the group of materials consisting essentially of metal oxides, transition metal oxides, and mixed metal oxides.

11. A charge storage device according to embodiment 9, wherein the nanostructured, mesoporous material comprises titanium dioxide ($TiO_2$).

12. A charge storage device according to embodiment 9, wherein the nanostructured, mesoporous material comprises a mesoporous structure with either mono- or bimodal pore size distribution.

13. A charge storage device according to embodiment 9, wherein the nanostructured, mesoporous material comprises a thin film, or a powder, or a monolith.

14. A charge storage device according to embodiment 9, wherein the nanostructured, mesoporous material comprises a film having grains oriented to alleviate strain associated with charging and discharging.

15. A charge storage device according to embodiment 9, wherein the nanostructured, mesoporous material comprises a monolith having grains oriented to alleviate strain associated with charging and discharging.

16. A charge storage device according to embodiment 9, wherein the nanostructured, mesoporous material exhibits three-dimensionally interconnected mesoporosity.

17. A charge storage device according to embodiment 9, wherein the conducting material is selected from the group of materials consisting essentially of carbonaceous materials, graphene, carbon nanotubes, metal nanowires, and conducting polymers.

18. A charge storage device, comprising a nanocrystalline, mesoporous, material with the material comprising a plurality of pores having nanocrystal walls.

19. A charge storage device according to embodiment 18, wherein the material is selected from the group of materials consisting essentially of metal oxides, transition metal oxides, and mixed metal oxides.

20. A charge storage device according to embodiment 18, wherein the material comprises titanium dioxide ($TiO_2$).

21. A charge storage device according to embodiment 18, wherein the material comprises a thin film, or a powder, or a monolith.

22. A charge storage device according to embodiment 18, wherein the material comprises a film having grains oriented to alleviate strain associated with charging and discharging.

23. A charge storage device according to embodiment 18, wherein the material comprises a monolith having grains oriented to alleviate strain associated with charging and discharging.

24. A charge storage device according to embodiment 18, wherein the material comprises a mesoporous structure with either mono- or bimodal pore size distribution.

25. A charge storage device according to embodiment 18, wherein the material exhibits three-dimensionally interconnected mesoporosity.

26. A charge storage device according to embodiment 18, wherein the nanocrystals have diameters ranging from approximately 1 nm to approximately 30 nm.

27. A charge storage device according to embodiment 18, wherein the nanocrystals have surfaces configured for contact by an electrolyte; and wherein the pores provide a pathway for solvent diffusion through the material.

28. A charge storage device according to embodiment 18, wherein the pores are flexible whereby strain associated with charging and discharging is alleviated.

29. A method for producing a nanostructured, mesoporous material construct, comprising: synthesizing a plurality of metal oxide nanocrystals; templating the metal oxide nanocrystals with a polymer template to form a templated film; disposing the templated film on a substrate; crystallizing the templated film; and removing the template from the templated film to provide a mesoporous nanocrystalline construct.

30. A method according to embodiment 29, further comprising: co-assembling a plurality of conductive nanoparticles with the nanocrystals and the polymer template to form a templated film.

31. A method according to embodiment 30, wherein the conductive nanoparticles are particles selected from the group of particles consisting essentially of noble metal nanowires, noble metal nanorods, carbon nanotubes, and polymer wrapped carbon nanotubes.

32. A method according to embodiment 29, wherein the metal oxide is an oxide selected from the group of oxides consisting essentially of chromium oxides, indium oxides, molybdenum oxides, niobium oxides, ruthenium oxides, titanium oxides, manganese oxides, iron oxides, nickel oxides, vanadium oxides, copper oxides, zinc oxides, cobalt oxides and tin oxides.

33. A method according to embodiment 29, wherein the metal oxide is a mixture of at least two transition metal oxides.

34. A method according to embodiment 29, further comprising: coating mesopores in the mesoporous nanocrystalline construct with conductive carbon; wherein said coating is in electrical contact with a conductive charge collector.

35. A method according to embodiment 34, wherein the conductive carbon coating is formed from thermal decomposition of the polymer template.

36. A method according to embodiment 35, wherein the polymer template comprises a polyacrylonitrile.

37. A method according to embodiment 29, wherein the substrate comprises a conductive metal sheet.

38. A device produced by the method of any of embodiments 29 through 37.

39. A method for producing a capacitive storage device, comprising: synthesizing a plurality of metal oxide nanocrystals; templating the metal oxide nanocrystals with a polymer template to form a templated film; disposing the templated film on a first electrically conductive substrate and a second electrically conductive substrate; crystallizing said templated films on the substrates; removing said template from the templated films to provide a mesoporous nanocrystalline electrode on said substrates; joining the electrodes of the first and second substrates to a separator to form a cell; and exposing the cell to an electrolyte.

40. A method according to embodiment 39, wherein said first and second electrically conductive substrates comprise a base sheet with a plurality of vertical conductive pins; wherein said templated films are disposed on the surface of said pins and said base.

41. A method according to embodiment 39, further comprising: co-assembling a plurality of conductive nanoparticles with the nanocrystals and the polymer to form a templated film.

42. A method according to embodiment 41, wherein the conductive nanoparticles are particles selected from the group of particles consisting essentially of noble metal nanowires, noble metal nanorods, carbon nanotubes, and polymer wrapped carbon nanotubes.

43. A method according to embodiment 39, wherein the metal oxide is an oxide selected from the group of oxides consisting essentially of chromium oxides, indium oxides, molybdenum oxides, niobium oxides, ruthenium oxides, titanium oxides, manganese oxides, iron oxides, nickel oxides, vanadium oxides, copper oxides, zinc oxides, cobalt oxides and tin oxides.

44. A method according to embodiment 39, wherein the metal oxide is a mixture of at least two transition metal oxides.

45. A method according to embodiment 39, further comprising: coating mesopores in the mesoporous nanocrystalline electrode with conductive carbon; wherein the coating is in electrical contact with the conductive substrate.

46. A method according to embodiment 45, wherein the conductive carbon coating is formed from thermal decomposition of the polymer template.

47. A method according to embodiment 46, wherein the polymer template comprises a polyacrylonitrile.

48. A device produced according to the method of any of embodiments 39 through 47.

49. A charge storage device comprising a nanostructured, mesoporous material.

50. A charge storage device according to embodiment 47, further comprising a nanoscale conducting material in contact with said nanostructured, mesoporous material.

51. A charge storage device according to embodiment 47: wherein said mesoporous material comprises a nanocrystalline material; and wherein said material includes a plurality of pores, said pores having nanocrystal walls.

52. A charge storage device according to embodiment 49, 50, or 51, wherein said mesoporous material is selected from the group of materials consisting essentially of metal oxides, transition metal oxides, and mixed metal oxides.

53. A charge storage device according to embodiment 49, 50, or 51, wherein said mesoporous material comprises titanium dioxide ($TiO_2$).

54. A charge storage device according to embodiment 49, 50, or 51, wherein said mesoporous material exhibits three-dimensionally interconnected mesoporosity.

55. A charge storage device according to embodiment 49, 50, or 51, wherein said mesoporous material comprises a mesoporous structure with either mono- or bimodal pore size distribution.

56. A charge storage device according to embodiment 49, 50, or 51, wherein said material comprises a thin film, or a powder, or a monolith.

57. A charge storage device according to embodiment 49, 50, or 51, wherein said mesoporous material comprises a film having grains oriented to alleviate strain associated with charging and discharging.

58. A charge storage device according to embodiment 49, 50, or 51, wherein said mesoporous material comprises a monolith having grains oriented to alleviate strain associated with charging and discharging.

59. A charge storage device according to embodiment 50, wherein the conducting material is selected from the group of materials consisting essentially of carbonaceous materials, graphene, carbon nanotubes, metal nanowires, and conducing polymers.

60. A charge storage device according to embodiment 51, wherein said nanocrystals have diameters ranging from approximately 1 nm to approximately 64 nm.

61. A charge storage device according to embodiment 51: wherein said nanocrystals have surfaces configured for contact by an electrolyte; and wherein said pores provide a pathway for solvent diffusion through the material.

62. A charge storage device according to embodiment 51, wherein said pores are flexible whereby strain associated with charging and discharging is alleviated.

63. A method for producing a nanostructured, mesoporous material construct, comprising: (a) synthesizing a plurality of metal oxide nanocrystals; (b) templating said metal oxide nanocrystals with a polymer template to form a templated film; (c) disposing said templated film on a substrate; (d)

crystallizing said templated film; and (e) removing said template from said templated film to provide a mesoporous nanocrystalline construct.

64. A method according to embodiment 63, further comprising co-assembling a plurality of conductive nanoparticles with said nanocrystals and said polymer to form a templated film.

65. A method according to embodiment 64, wherein said conductive nanoparticles are particles selected from the group of particles consisting essentially of noble metal nanowires, noble metal nanorods, carbon nanotubes, and polymer wrapped carbon nanotubes.

66. A method according to embodiment 63, wherein said metal oxide is an oxide selected from the group of oxides consisting essentially of chromium oxides, indium oxides, molybdenum oxides, niobium oxides, ruthenium oxides, titanium oxides, manganese oxides, iron oxides, nickel oxides, vanadium oxides, copper oxides, zinc oxides, cobalt oxides and tin oxides 67. A method according to embodiment 63, wherein said metal oxide is a mixture of at least two transition metal oxides.

68. A method according to embodiment 63, further comprising: coating mesopores in said mesoporous nanocrystalline construct with conductive carbon; wherein said coating is in electrical contact with a conductive charge collector.

69. A method according to embodiment 68, wherein said conductive carbon coating is formed from thermal decomposition of said polymer template.

70. A method according to embodiment 69, wherein said polymer template comprises a polyacrylonitrile.

71. A method according to embodiment 63, wherein said substrate comprises a conductive metal sheet.

72. A method according to embodiment 63, wherein said steps (c), (d) and (e) comprise: disposing said templated film on a first electrically conductive substrate and a second electrically conductive substrate; crystallizing said templated films on said substrates; removing said template from said templated films to provide a mesoporous nanocrystalline electrode on said substrates; joining said electrodes of said first and second substrates to a separator to form a cell; and exposing said cell to an electrolyte.

73. A method according to embodiment 72: wherein said first and second electrically conductive substrates comprise a base sheet with a plurality of vertical conductive pins; and wherein said templated films are disposed on the surface of said pins and said base.

74. A method according to embodiment 72, further comprising co-assembling a plurality of conductive nanoparticles with said nanocrystals and said polymer to form a templated film.

75. A method according to embodiment 74, wherein said conductive nanoparticles are particles selected from the group of particles consisting essentially of noble metal nanowires, noble metal nanorods, carbon nanotubes, and polymer wrapped carbon nanotubes.

76. A method according to embodiment 72, wherein said metal oxide is an oxide selected from the group of oxides consisting essentially of chromium oxides, indium oxides, molybdenum oxides, niobium oxides, ruthenium oxides, titanium oxides, manganese oxides, iron oxides, nickel oxides, vanadium oxides, copper oxides, zinc oxides, cobalt oxides and tin oxides.

77. A method according to embodiment 72, wherein said metal oxide is a mixture of at least two transition metal oxides.

78. A method according to embodiment 72, further comprising: coating mesopores in said mesoporous nanocrystalline electrode with conductive carbon; wherein said coating is in electrical contact with said conductive substrate.

79. A method according to embodiment 78, wherein said conductive carbon coating is formed from thermal decomposition of said polymer template.

80. A method according to embodiment 79, wherein said polymer template comprises a polyacrylonitrile.

81. A product produced according to the method of any of embodiments 63 through 80.

Although the description herein contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art. In any appended claims, reference to an element in the singular is not intended to mean "one and only one" unless explicitly so stated, but rather "one or more." All structural, chemical, and functional equivalents to the elements of the preferred embodiments that are known to those of ordinary skill in the art are expressly incorporated herein by reference and are intended to be encompassed by the present disclosure. Moreover, it is not necessary for a device or method to address each and every problem sought to be solved by the present invention, for it to be encompassed by the present disclosure. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A nanostructured, mesoporous electrode, comprising:
   an electrically conductive substrate;
   at least one mesoporous, nanocrystalline material with a plurality of pores, said pores having nanocrystalline walls, said pores being flexible whereby strain associated with charging and discharging is alleviated; and
   a nanoscale conducting material in contact with said mesoporous material and said conductive substrate.

2. The electrode of claim 1, wherein the mesoporous, nanocrystalline material is selected from the group of materials consisting essentially of metal oxides, transition metal oxides and mixed metal oxides.

3. The electrode of claim 1, wherein the nanoscale conducting material is selected from the group of materials consisting essentially of carbonaceous materials, graphene, carbon nanotubes, metal nanowires, and conducting polymers.

4. The electrode of claim 1:
   wherein the electrically conductive substrate comprises a base sheet with a plurality of vertical conductive pins, the base sheet and pins having a surface;
   wherein said nanocrystalline and conductive materials are disposed on the surface of said pins and said base sheet.

* * * * *